US007373296B2

(12) United States Patent

Van De Par et al.

(10) Patent No.: US 7,373,296 B2

(45) Date of Patent: May 13, 2008

(54) METHOD AND APPARATUS FOR CLASSIFYING A SPECTRO-TEMPORAL INTERVAL OF AN INPUT AUDIO SIGNAL, AND A CODER INCLUDING SUCH AN APPARATUS

(75) Inventors: Steven Leonardus Josephus Dimphina Elisabeth Van De Par, Eindhoven (NL); Jan Janto Skowronek, Bochum (DE)

(73) Assignee: Koninklijke Philips Electronics N. V., Eindhoven (NL)

( * ) Notice: Subject to any disclaimer, the term of this patent is extended or adjusted under 35 U.S.C. 154(b) by 210 days.

(21) Appl. No.: 10/558,084

(22) PCT Filed: May 27, 2003

(86) PCT No.: PCT/IB03/02336

§ 371 (c)(1),
(2), (4) Date: Nov. 23, 2005

(87) PCT Pub. No.: WO2004/010738

PCT Pub. Date: Dec. 4, 2004

(65) Prior Publication Data

US 2006/0247929 A1 Nov. 2, 2006

(30) Foreign Application Priority Data

May 24, 2002 (EP) .................................. 02077032

(51) Int. Cl.
*G10L 21/00* (2006.01)
*G10L 19/00* (2006.01)
*G10L 15/00* (2006.01)

(52) U.S. Cl. .................. 704/226; 704/200.2; 704/205; 704/233

(58) Field of Classification Search ..................... None
See application file for complete search history.

(56) References Cited

U.S. PATENT DOCUMENTS 5,588,024 A * 12/1996 Takano ........................ 375/242

(Continued)

FOREIGN PATENT DOCUMENTS

EP 0931386 B1 7/1999

(Continued)

OTHER PUBLICATIONS

Dau, T. Pushcel, D. "A quantitative model of hte effective signal processing in the auditory system. I. Model structure" Journal for the Acoustical Society of America, 99(6), Jun. 1996.*

(Continued)

*Primary Examiner*—David Hudspeth
*Assistant Examiner*—Matthew J. Sked

(57) ABSTRACT

A method of classifying a spectro-temporal interval of an input audio signal (x(t)) is disclosed. A spectro-temporal interval of the input audio signal is first modelled (62 . . . 71) according to a perceptual model to provide a first representation (Rep 1). The spectro-temporal interval is then modelled (62 . . . 71) using a modified noise substituted input signal according to the same perceptual model to provide a second representation (Rep 2). The spectro-temporal interval is then classified as being noise or not based on a comparison of the first and second representations.

14 Claims, 10 Drawing Sheets

U.S. PATENT DOCUMENTS 6,271,771 B1 8/2001 Seitzer et al.
6,424,939 B1 * 7/2002 Herre et al. ................ 704/219
7,194,093 B1 * 3/2007 Thiede .......................... 31/58

FOREIGN PATENT DOCUMENTS

WO 9904505 A1 1/1999
WO 0115143 A1 3/2001

OTHER PUBLICATIONS

Dau, T. Kollmeier, B. "Modeling Auditory processing of amplitude modulation. I. detection and masking with narrow-band carriers" Journal for the Acoustical Society of America 102(5), Nov. 1997.*

Levine, S. Smith, J. "Improvements to the Switched Parametric & transform audio coder" Proc IEEE Workshop on applications of signal processing to audio and acoustics, Oct. 17-20, 1999.*

Van de Par, S. Kohlrausch, A. Charestan, G. Heusdens, R. "A new psychoacoustical masking model for audio coding applications" Acoustics, Speech and Signal Processing 2002, pp. 1805-1808, 2002.*

Hant, J. Alwan, A. "A psychoacoustic-masking model to predict the perception of speech-like stimuli in noise" Speech Communication, May 2003 p. 291-313.*

S. N. Levine et al: Improvements to the Switched Parametric and Transform Audio Coder, IEEE Oct. 1999, pp. 43-46, XP010365091.

* cited by examiner

METHOD AND APPARATUS FOR CLASSIFYING A SPECTRO-TEMPORAL INTERVAL OF AN INPUT AUDIO SIGNAL, AND A CODER INCLUDING SUCH AN APPARATUS

The present invention relates to a method of coding an audio signal.

The operation of coders such as the MPEG coder is well known. In one implementation, FIG. 1, an input PCM (Pulse Code Modulated) signal x(t) is supplied to a sub-band filter bank (SBF) 10 comprising 1024 filters 11 with respective transfer functions $H_1 \ldots H_{1024}$. Each filtered signal is decimated and then supplied to a scaler (SC) 12, which determines appropriate scale factors for each band. Separately, a masking threshold and bit allocation calculator (MT/BA) 13 typically operating with some form of psycho-acoustic model, determines a bit allocation for each frequency band where bit rate is balanced against distortion introduced during quantisation. Each filtered and scaled signal is then quantized (Q) 14 according to the allocated bit rate before being fed to a multiplexer (MUX) 15 where the final audio stream (AS) including quantized signals, scale factors and bit allocation information is generated.

It is known that some spectral and/or temporal parts of audio signals can be represented in a highly efficient manner (e.g. 4 to 10 kb/s) with only a noise model description.

Thus, in relation to FIG. 1, the input signal x(t) can be fed to a selection component (Sel) 16 which classifies frequency bands for temporal intervals as either noisy or not. When a spectro-temporal interval is determined to be noisy, the selection component 16 instructs the multiplexer 15 not to code sub-band signals for that interval. The spectro-temporal interval of the input signal x(t) is instead modelled with a noise analyser (NA) 17 whose output is quantized (Q) 18 according to the available bit rate.

A notorious problem, however, is to decide what part of the audio signal can be represented by noise. The decision is based on the assumption that modelling part of the audio signal with noise will not lead to a reduction in quality. In addition, it should also lead to an increase in the efficiency with which the signal can be encoded.

In Schulz, D. "Improving audio codecs by noise substitution", J. Audio Eng. Soc., Vol. 44, pp. 593-598, 1996, it is shown that statistical signal properties of a signal can be derived to make the above classification. Exemplary techniques disclosed by Schulz include:

- Tracking of spectral peaks in successive spectra.
- Using predictors in the frequency domain.
- Using predictability in the time domain with a transversal filter.

In the both the latter examples it is assumed that the more predictable a signal is, the more tonal it is and as such predictability is assumed to be the opposite of noisiness.

Other techniques are based on an analysis of the spectral flatness of a frame (usually over a short duration e.g. 10-20 ms). Again, the flatter the spectrum, the noisier is it considered.

In Herre, J. Schulz, D. "Extending the MPEG-4 AAC codec by perceptual noise substitution", in Proc. 104th convention of the Audio Eng. Soc., Amsterdam, preprint 4720, 1998, the above statistical methods are mentioned in the context of MPEG 4 AAC. Here spectro-temporal intervals correspond to scale-factor-bands and frames and when these are modelled by noise a bit rate saving is made.

It will be seen, however, that the signal statistical criteria of the prior art do not necessarily coincide with criteria that are employed by a human observer i.e. a possible match between these criteria is more or less coincidental.

According to the present invention there is provided a method according to claim 1.

The present invention is based on a noise classification of spectro-temporal intervals of generic audio signals using a perceptual or psycho-acoustical model. The invention is based on predicted audibility of noise substitution, i.e. if noise substitution is predicted to be inaudible to a human observer, it does not lead to perceptual degradation.

Embodiments of the invention will now be described, by way of example, with reference to the accompanying drawings, in which.

Figure 1:
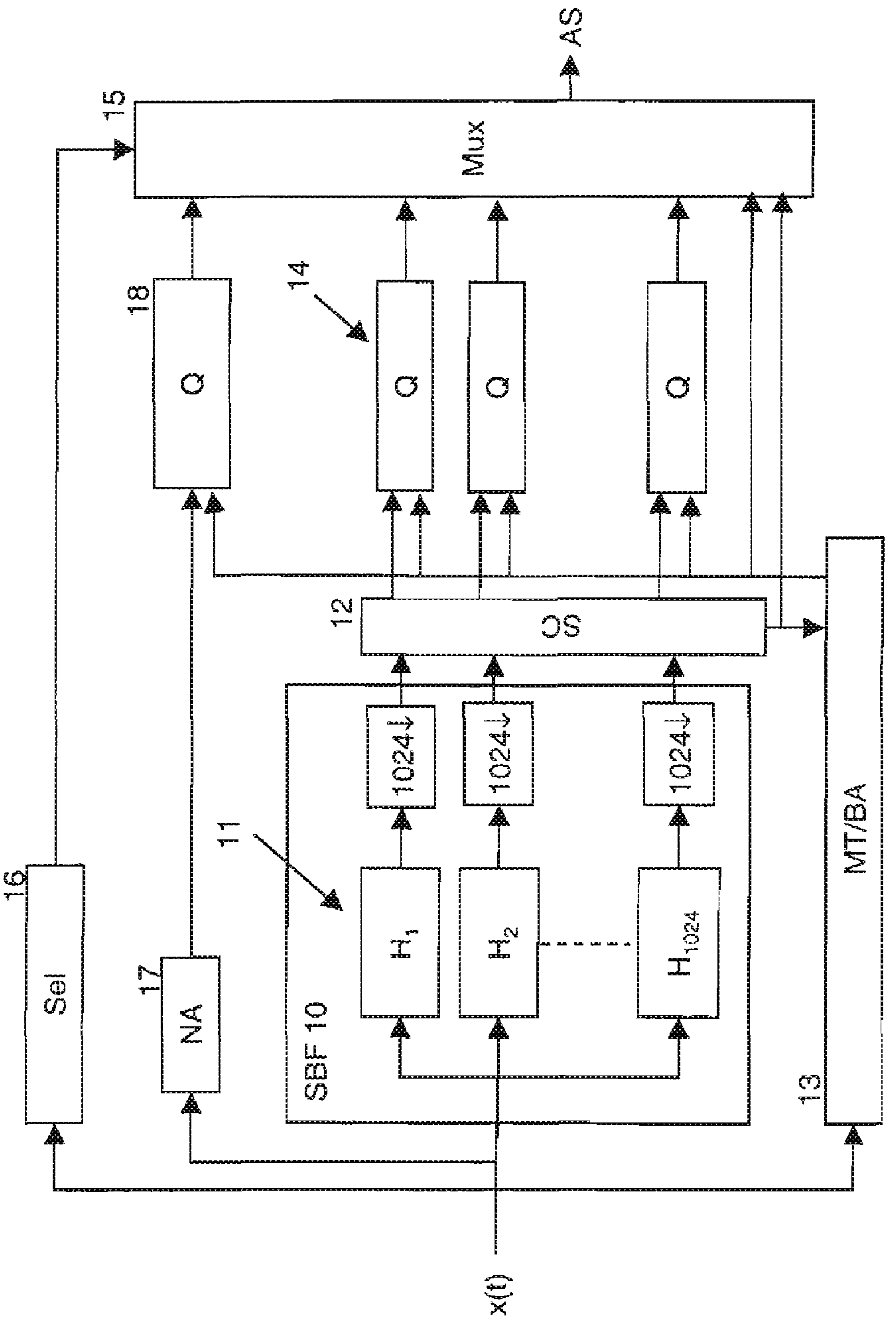
Figure 1 PRIOR ART
FIG. 1 shows a conventional MPEG encoder where selected spectro-temporal portions of an audio signal are represented with noise model parameters.

In a first embodiment of the present invention an improved selection component is employed in an MPEG coder of the type shown in FIG. 1 to determine whether spectro-temporal intervals can best be modelled through sub-band filtered signals or with a noise model.

Figure 2:
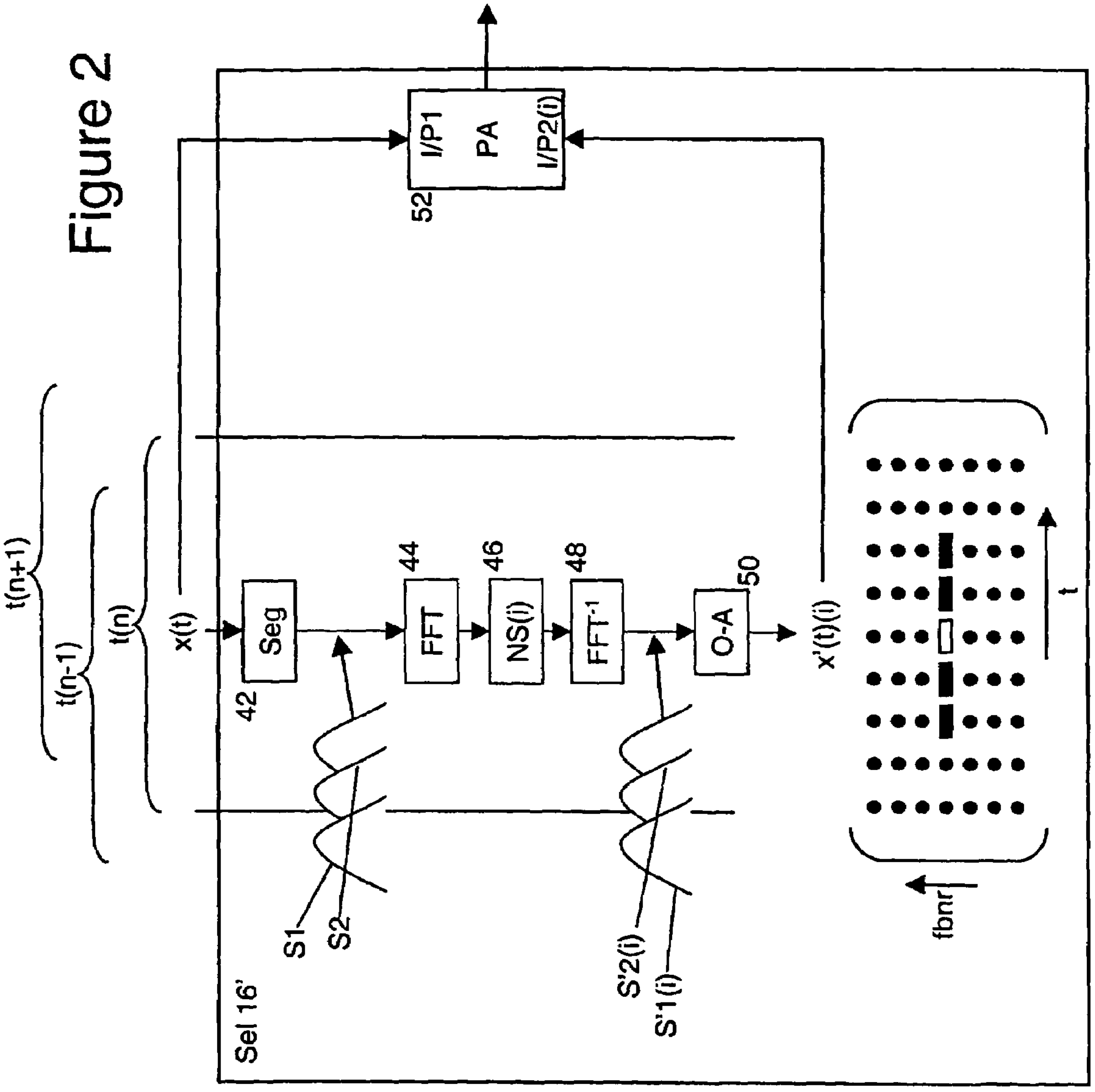
FIG. 2 illustrates the operation of an improved selection component according to an embodiment of the invention operable within the encoder of FIG. 1.

Referring now to FIG. 2, in general, the improved selection component (Sel) 16' iteratively tests for the substitution of noise modelling for each of a plurality of frequency bands i for an interval n of input signal x(t). Preferably, the selection component makes its tests over a time period exceeding the basic interval length of the coder.

In the embodiment, an interval t(n) of the PCM format input signal x(t) surrounding the test interval n, is split into a sequence of 9 short overlapping segments . . . s1,s2 . . . These segments are each windowed with a square root Hanning window (or some other analysis window) in segmentation unit 42. (It will be seen that the specific number of intervals is not critical in implementing the invention and for example 8 or 11 intervals could also be used.) At the same time, the signal x(t) for the interval t(n) is provided as an input I/P1 to a psycho-acoustic analyser 52.

A FFT (Fast Fourier Transform) is applied on each time-domain windowed signal . . . s1,s2 . . . , resulting in respective complex frequency spectrum representations of the windowed signals, step 44.

For each representation and for each frequency band i, a noise analyser/synthesizer 46 provides a noise modelled signal for the frequency band i with the remainder of the spectrum unchanged. This noise modelled signal is preferably based on the same model used by the noise analyser (NA) 17 in the encoder proper.

The selection component then takes an inverse FFT of each noise substituted signal to obtain time domain signals . . . s'1(*i*),s'2(*i*) . . . , step 48. In step 50, the separate segments are recombined by first windowing again with a square-root Hanning window (or some other synthesis window) and applying an overlap-add method. This results in a long PCM signal x'(t)(i) corresponding to each segment i for which noise has been substituted across the interval t(n). The signals x'(t)(i) are then sent as a series of test input signals I/P2(*i*) to a pyscho-acoustic analyser (PA) 52. In the matrix shown at the lower part of FIG. 2, a symbolic representation of the modified signal is shown where noise is substituted in the i-th frequency band. Along the horizontal axis, time is depicted, along the vertical axis, the frequency band number (fbnr) corresponding to the scale factor bands used in the AAC encoder. Dots denote areas that contain the original signal samples, the bars depict areas with noise substituted. The grey bar denotes the area to which the noise classification applies.

Within the analyser 52, a perceptual or psycho-acoustic model is used to compute a difference (reduction in quality) between the modified input signals (I/P2(*i*)) and the original signal (I/P1). If this perceptual difference does not exceed a certain criterion value, it is assumed that the middle spectro-temporal interval out of the 9 intervals that have been substituted with noise i.e. the frequency band i for interval n, can indeed be replaced by noise model parameters. In this fashion all spectro-temporal intervals are studied one by one to make a decision about noise substitutions for all intervals.

It has been found that using the above embodiment where, based on the outcome of the perceptual model, a decision is made for only one of 9 subsituted intervals, a critically more reliable decision about noise substitution is made than by testing and substituting only a single interval at a time.

After all spectro-temporal intervals had been evaluated in this way, the analyser 52 indicates to the multiplexer (MUX), FIG. 1, for which of the frequency bands of interval n actual noise substitution can be made.

It should be noted that in the preferred embodiment, testing is always performed on the original signal with noise only being substituted in the frequency band i being tested, i.e. even if the analyser 52 had determined that noise could be substituted for band i−1 in interval n−1, the original signal would be employed when testing band i in interval The multiplexer then picks the data to be encoded from either the quantiser 18 for noise analyser NA or the quantiser(s) 14 for the sub-band filter(s) 11 as appropriate and especially with regard to savings in bitrate which may be provided by switching between noise and sub-band filter models.

It will also be seen that the selection component 16' could also be in communication with either or both of the sub-band filters 11 and the noise analyser 17 or the quantisers 14, 18 switching these in and out as appropriate to reduce the overall processing performed by the system. However, this would require the selection component to run ahead of the noise analyser 17 and sub-band filter 10 components and may introduce an undesirable lag in the encoder. Thus, in implementing the embodiment described above lag needs to be balanced against processing overhead.

In a particularly preferred implementation of the first embodiment described above, the perceptual model employed in the analyser 52 is based on a model generally of the type disclosed in Dau, T., Puschel, D., Kohlrausch, A. "A quantitative model of the "effective" signal processing in the auditory system", J. Acoust. Soc. Am., Vol. 99, 3615-3631, June 1996; and Dau, T., Kollmeier B., Kohlrausch, A. "Modelling auditory processing of amplitude modulation. I. Detection and masking with narrow-band carriers", J. Acoust. Soc. Am., Vol. 102, 2892-2905, November 1997, FIG. 3.

In Dau, an input signal (I/P1 or I/P2) is first sent through an auditory filterbank 62. It is known, that each location on the basilar-membrane inside the human cochlea has a specific bandpass-filter characteristic. The filterbank 62 thus models the frequency-place transformation of the basilar-membrane by producing a plurality x of band-pass filtered time-domain signals which are fed to the next stage in the model. (Each of the next stages in FIG. 3 operates on each of the filterbank output signals, however, the processing for only 1 of the x signals is illustrated.)

The next step is a haircell model, comprising half-wave rectification 63, low-pass filtering 64 with a cut-off frequency of 1 kHz and down sampling 65 of each filtered signal. Here the transformation of the mechanical oscillations of the basilar-membrane into receptor potentials in the inner haircells is approximated. The next phase comprises feedback loops 66 to account for the adaptive properties of the auditory periphery.

A modulation or linear filterbank 67 then accounts for the temporal pattern processing of the auditory system. The modulation filterbank comprises a total of y filters divided into two sets, each with different scaling. The first set comprises a filter with a band-width of 2.5 Hz with the next filters going up to 10 Hz having a constant bandwidth of 5 Hz. The second set, for frequencies between 10 and about 1000 Hz, has a logarithmic scaling where the ratio Q=center frequency/bandwidth=2 is constant, to bring the total to y filters.

In Dau, the modulation filterbank 67 provides a time-domain modulation spectrum. Thus a matrix of x*y of such modulation spectra is produced to represent each input signal. Internal noise 68 is then added to each modulation spectrum signal to model the limited performance resolution of the auditory system.

For each input signal, each matrix representation (Rep 1 and Rep 2) 70 is then fed to a detector 69 which determines the difference (D) between both representations. This quantity can be compared to a pre-determined threshold to indicate whether the difference between signals is audible.

Thus, each individual matrix cell in Dau is a time signal i.e. for each auditory filter and each subsequent modulation filter, there is a time signal resulting from I/P 1 that is compared with a template resulting from I/P 2 to determine whether a certain test-signal (or distortion) is audible.

Thus, if applying Dau straightforwardly to the problem of determining whether noise substitution may be audible, the full temporal structure of a signal would be used in the decision process. Thus, every detail of a substituted noise token could lead to predicted distortion. In reality, listeners are not sensitive to the specific details of a noise signal. In other words, each different token of noise that may be substituted would give a different internal representation. Therefore, the likelihood that one specific substituted noise token would give an internal representation that is very similar to the internal representation due to the original (unmodified) signal would be very small.

Figure 3:
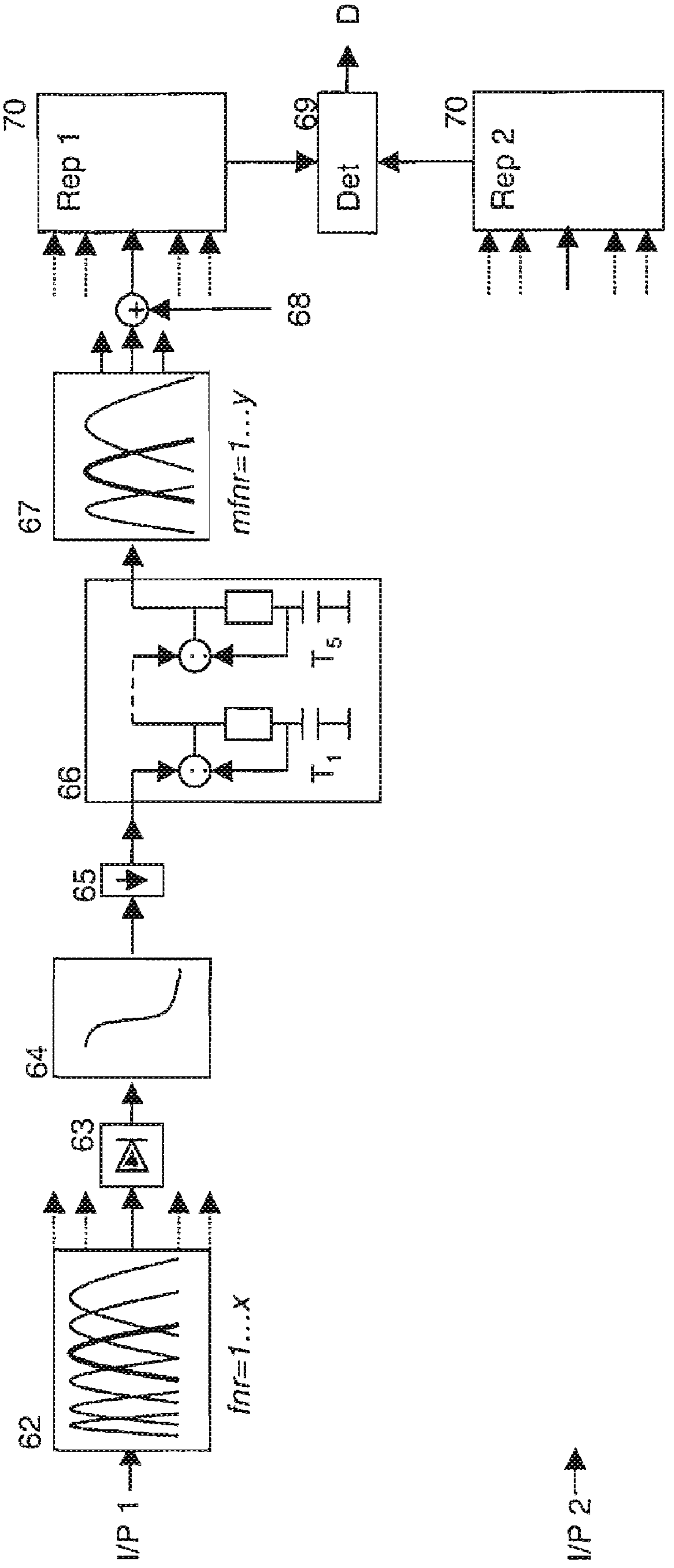
Figure 3 PRIOR ART
FIG. 3 is a block diagram of a known psycho-acoustic based signal comparison model.
Figure 4:
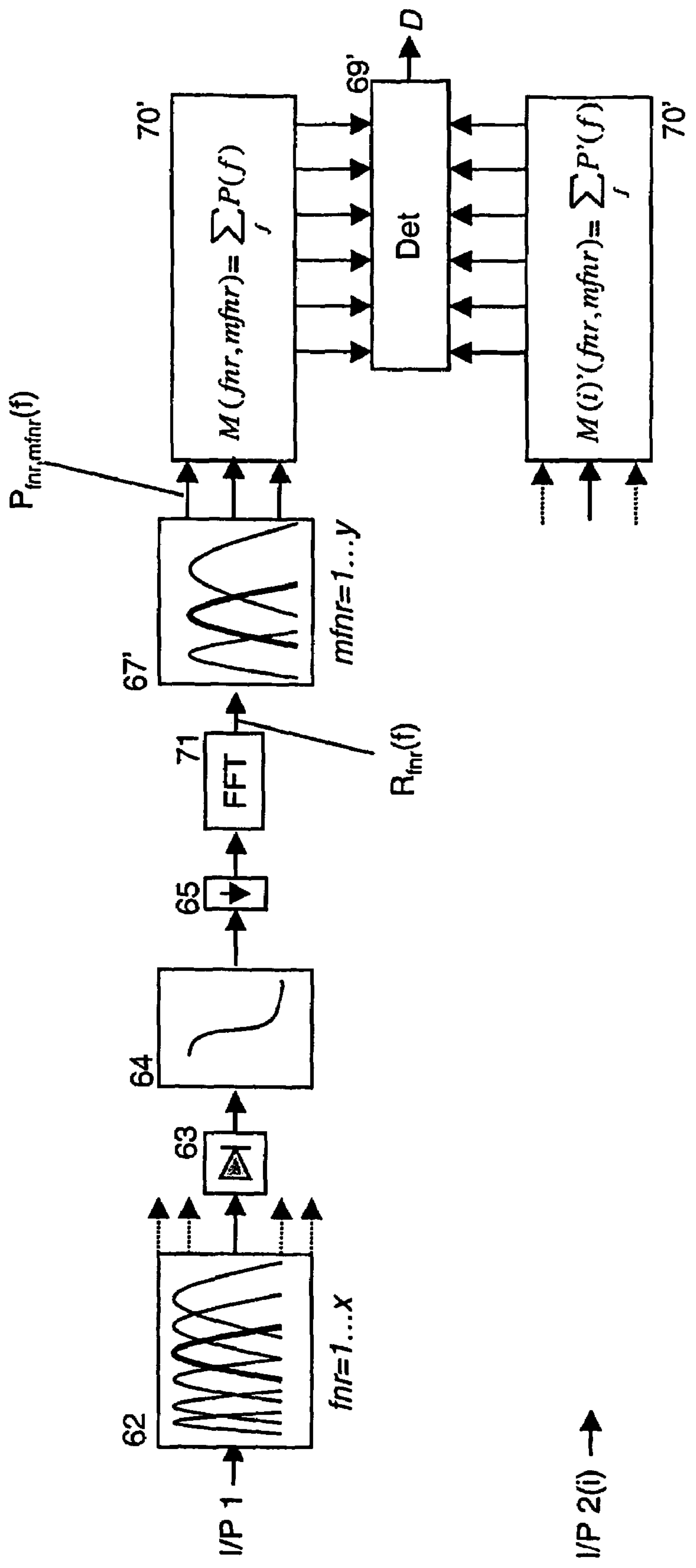
FIG. 4 shows a block diagram of a preferred embodiment of a psycho-acoustic based signal comparison model for use in the selection component of FIG. 2.

FIG. 4 on the other hand shows the main stages of the modified psycho-acoustic model on which the analyser 52 of the preferred embodiment is based. Initially, it will be seen that, for simplicity, the adaptation loops 66 and noise adder 68 of FIG. 3 are not employed. However, one or both of these stages can be employed if desired.

However, as distinct from the time-based solution of Dau, the embodiment of FIG. 4, transforms the time domain signals produced by the haircell model with transform unit (FFT) 71 into respective frequency domain representations. Then modulation filters 67' are applied in the spectral domain (as a weighting function) to produce a plurality of modulation spectra for each of the x original signals.

In more detail, for each of the x time signals supplied to the transform unit 71 a power spectrum, ($R_{fnr}$(f), for an interval corresponding to about 100 ms of the input signal is calculated. Typically, the noise substituted part (if present) is in the middle of this interval. For the conversion to modulation spectra (67'), weighting functions $w_{mfnr,fnr}(f)$ are defined where 'mfnr' is the index of the weighting function (or modulation filter number) and 'fnr' is the number of the auditory filter channel from the filterbank 62 and $w_{mfnr,fnr}(f)$ is a function of frequency. For low frequencies the bandwidths of the individuals filters 67' are small and constant (e.g. 10 to 50 Hz) and above a certain frequency the filters have a constant Q preferably between 1 and 4. The shape of the window function can for example be a Hanning window shape, or the amplitude transfer function of a gamma-tone filter. In a preferred implementation, the smallest filter width is 50 Hz, and Q=2. It will be seen that the lowest frequency weighting function is centred at 0 Hz, and so covers only the upper half of the filter shape (everything beyond the maximum).

The weighting functions are squared and multiplied with the power spectra to result in a series of numbers $P_{mfnr,fnr}(f)$ that are used as the internal representation that is fed to an averager 70'.

Figure 5:
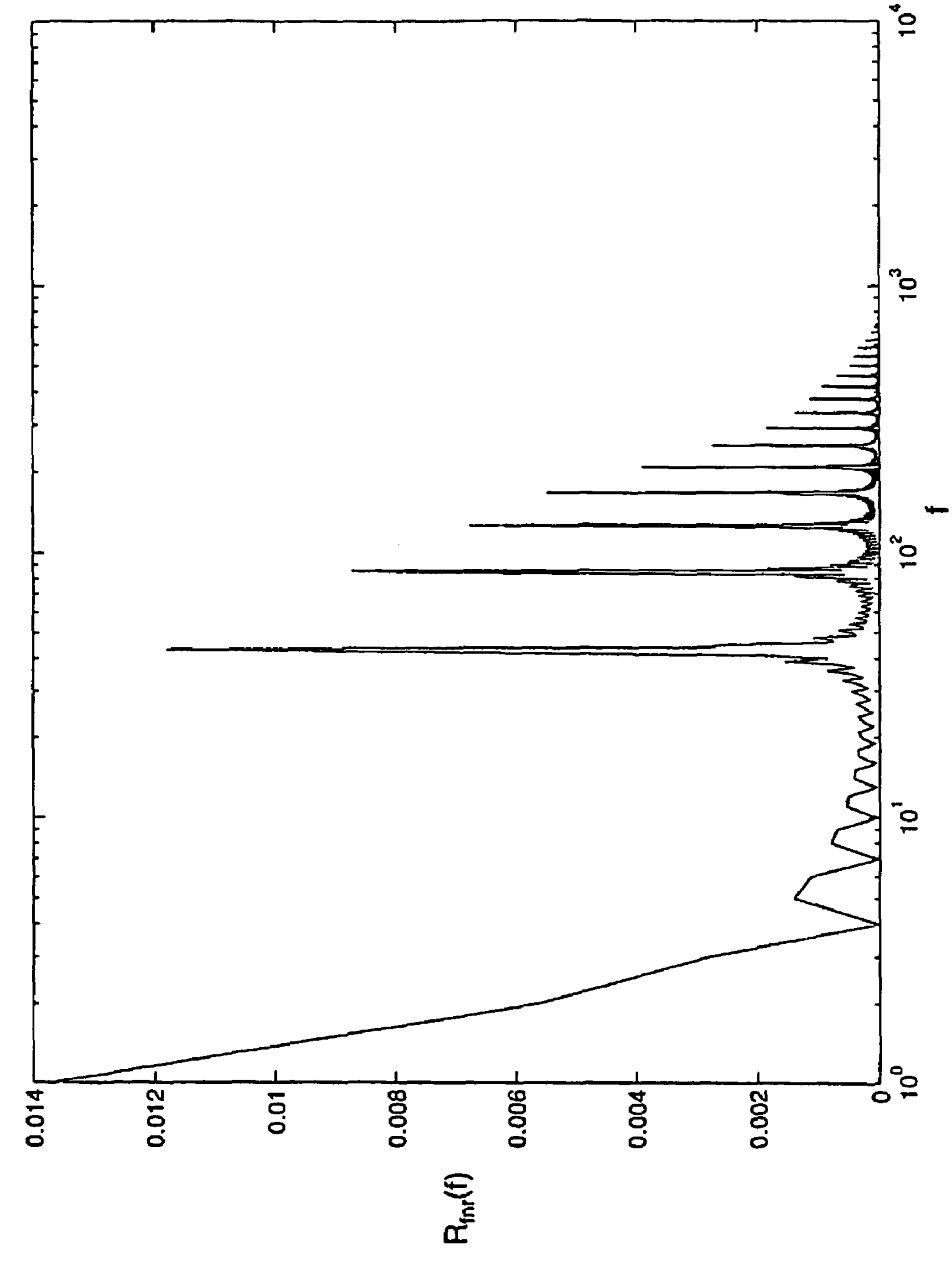
FIG. 5 shows a power spectrum ($R_{fnr}(f)$) of an harmonic tone-complex produced by the FFT component of the model of FIG. 4.
Figure 6:
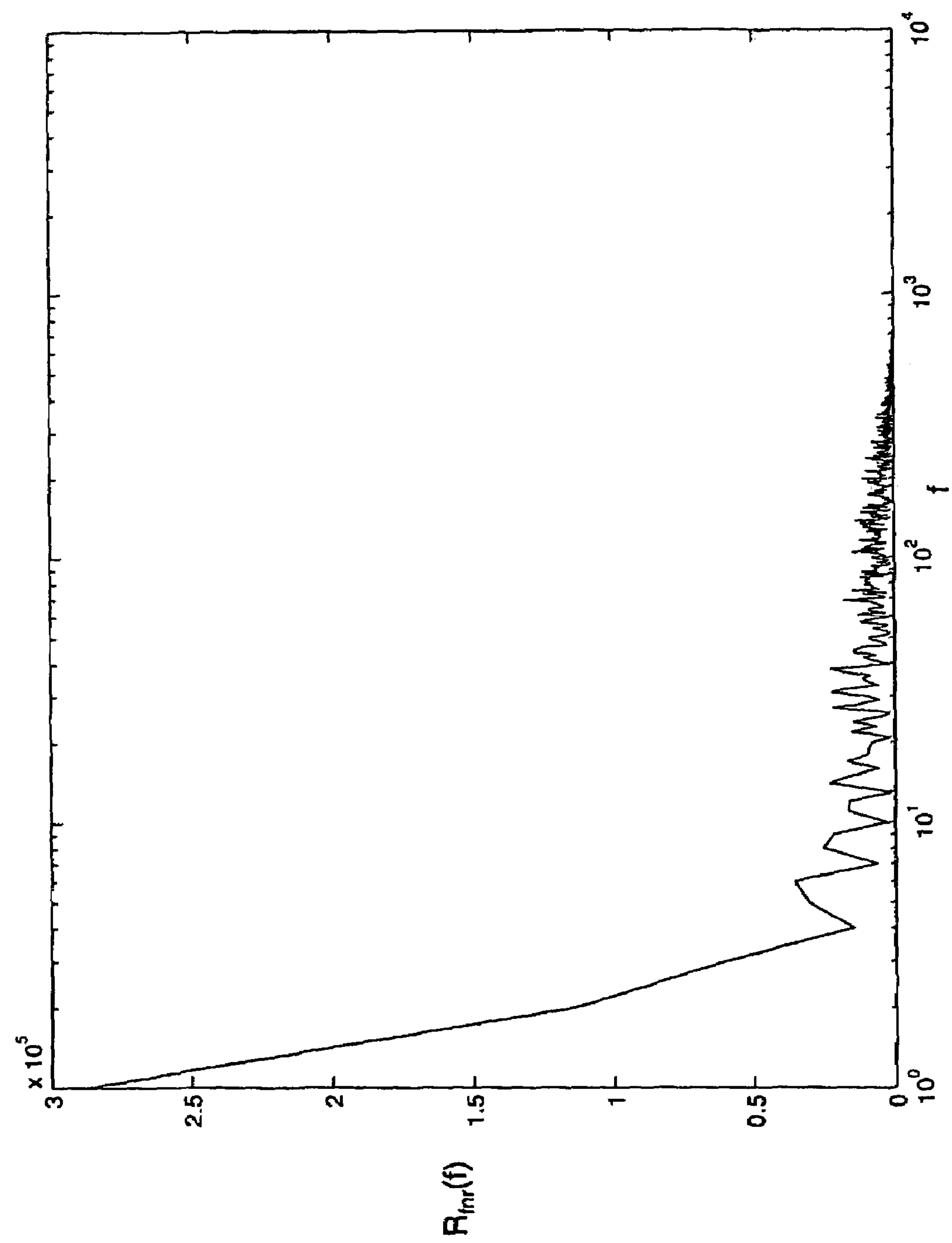
FIG. 6 shows a power spectrum ($R_{fnr}(f)$) of Gaussian noise produced by the FFT component of the model of FIG. 4.
Figure 9A:
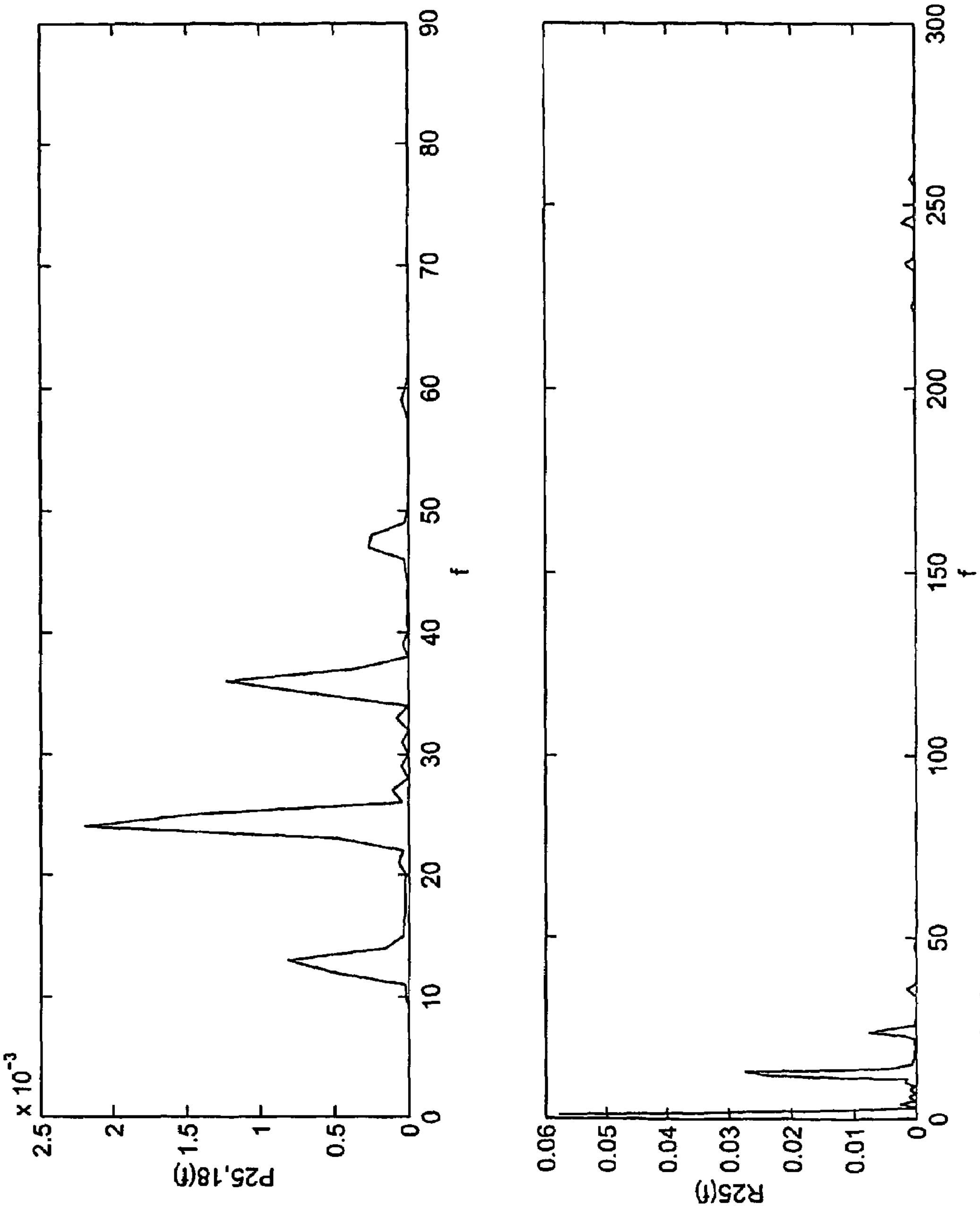
FIGS. 9(*a*) and 9(*b*) illustrate the input ($R_{25}$) and modulation spectrum output ($P_{25,18}$) of one of the filters (25,18) of the filterbank of the model of FIG. 4 for an harmonic tone complex and for a noise input signal respectively.
Figure 9B:
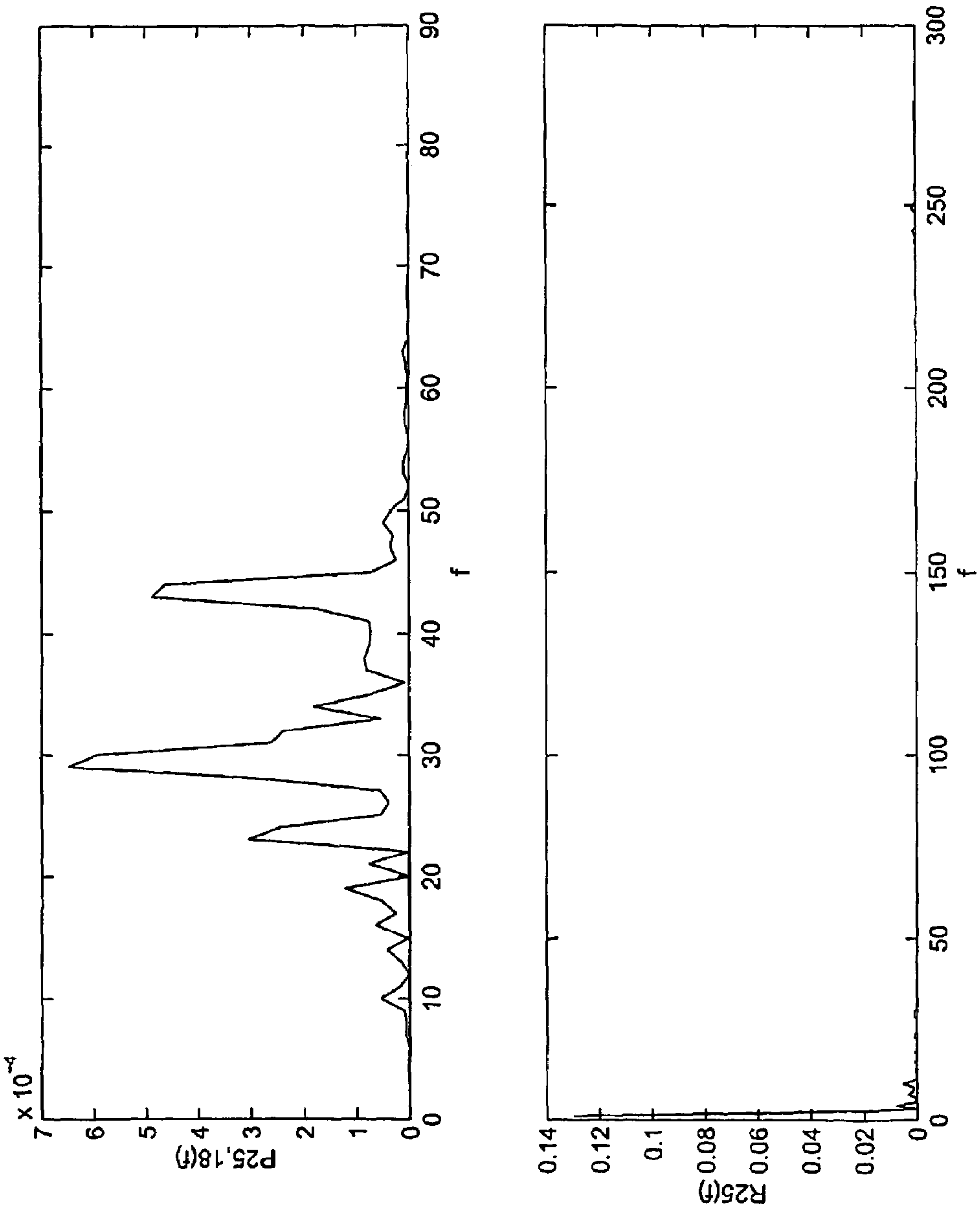

To illustrate this FIGS. 5 and 6 show the power spectra ($R_{fnr}$(f)) of an harmonic tone-complex and Gaussian noise respectively provided as input to the filterbank 67'. FIGS. 9(*a*) and 9(*b*) illustrate the input ($R_{25}$) corresponding to FIGS. 5 and 6 and modulation spectrum output ($P_{25,18}$) of one of the filters (25,18) of the filterbank 67' for an harmonic tone complex with a fundamental frequency of 100 Hz and for a noise input signal respectively. Both input signals are of equal spectral density and total level. However, it is clear that the filter $P_{25,18}$(f) has an average higher output level for the harmonic tone complex than for the noise signal. Thus, the summed values ($M_{25,18}$) will be different. For the noise signal M is 0.0054, whereas for the harmonic tone complex M is 0.0093, nearly a factor of two difference. So a matrix of values M presents a representation that differs considerably for noise and harmonic tone complex signals and this shows that classification of noise signals using this model is possible.

In the model of FIG. 4, the powers $P_{mfnr,fnr}$ (f) for each modulation spectrum are summed (70') to produce a value for each cell in a matrix M. In this way the activity (M(fnr,mfnr)) within each modulation filter averaged over some time (9 frames) is determined. This average is not sensitive to the specific details of a noise signal which obviates the problem of using the Dau model outlined above. The activity for each filter for one signal can then be compared with the corresponding activity (M') for another signal processed in parallel to provide a perceptual measure D of the difference between the signals:

$$D = \sqrt{\sum_{fnr}\sum_{mfnr}(M - M')^2 / M^2}$$

The value D can then compared to a criterion to determine whether noise substitution is allowed. It should be noted that the criterion can be frequency dependent. For example, for low frequencies, the criterion can be lower and proportional to the bandwidth of the auditory filters; and for high frequencies the criterion can be constant.

Also, the selection component 16' or analyser 52, FIG. 2, may require that more than a threshold number of contiguous frequency bands for more than continuous number of intervals can be modelled with noise before instructing the multiplexer (MUX) to switch to a noise model, as only when these thresholds are exceeded would the required saving in bit-rate be made by swapping to a noise model.

In experiments, the embodiment described above was tested on a number of short (300 ms) segments of stationary audio. It was found in a listening test that with 50% to 80% of bandwidth replaced, an audio quality could be obtained that was comparable to that of MPEG 1 Layer III at a bitrate of 96 kbit/sec for mono audio.

In the first embodiment of the invention, noise is iteratively substituted and tested. For each test, the model output of the original signal is compared to the model output of a modified signal i.e. with noise substituted. Based on this comparison a decision is made whether noise can be substituted or not. However, it will be seen that this approach is computationally intensive.

An alternative approach is to make a direct decision for particular time intervals and for particular auditory filters (62,67') that are suspected to be good candidate spectro-temporal intervals for noise substitution, for example, intervals having low energy levels.

In this case one input signal, say I/P2, comprises a synthetic noise signal. The model output (Rep 2) for this signal is then compared directly to the model output (Rep 1) for the original signal to provide a difference measure (D). It will be seen that for a given spectro-temporal interval Rep 2 can be pre-calculated so reducing the computational intensity of this approach.

When the difference between Rep 1 and Rep 2 is smaller than a certain criterion one can assume that noise can be substituted within that particular spectro-temporal interval because apparently in that interval the input audio signal is very similar to a noise signal (in a perceptual sense).

It will be seen that in the first embodiment, masking is inherently taken into account in the decision process. This is useful because when a certain spectro-temporal interval is masked, it can be substituted with noise without any problem. In the alternative implementation, it cannot be seen directly how modification of a certain spectro-temporal interval will affect the model output. In order to be able to do this, it is beneficial to consider to what extent the candidate spectro-temporal interval for noise substitution is masked by other signal components. This can be taken into account by giving a rating to the detectability (det) of the substitution of a spectro-temporal interval, i.e. the degree to which it is masked by other components. So, for example, a low energy interval within a high power signal would have a low detectability rating. The product of detectability (det) and the difference measure (D) that is obtained for an candidate interval is assumed to be a good indicator as to whether noise can be substituted or not.

This approach is much faster than the approach of the first embodiment because it requires only a single pass (instead of many) of the original input signal through the model plus the derivation of the masking properties, something which can be achieved without extensive computational complexity.

Figure 7:
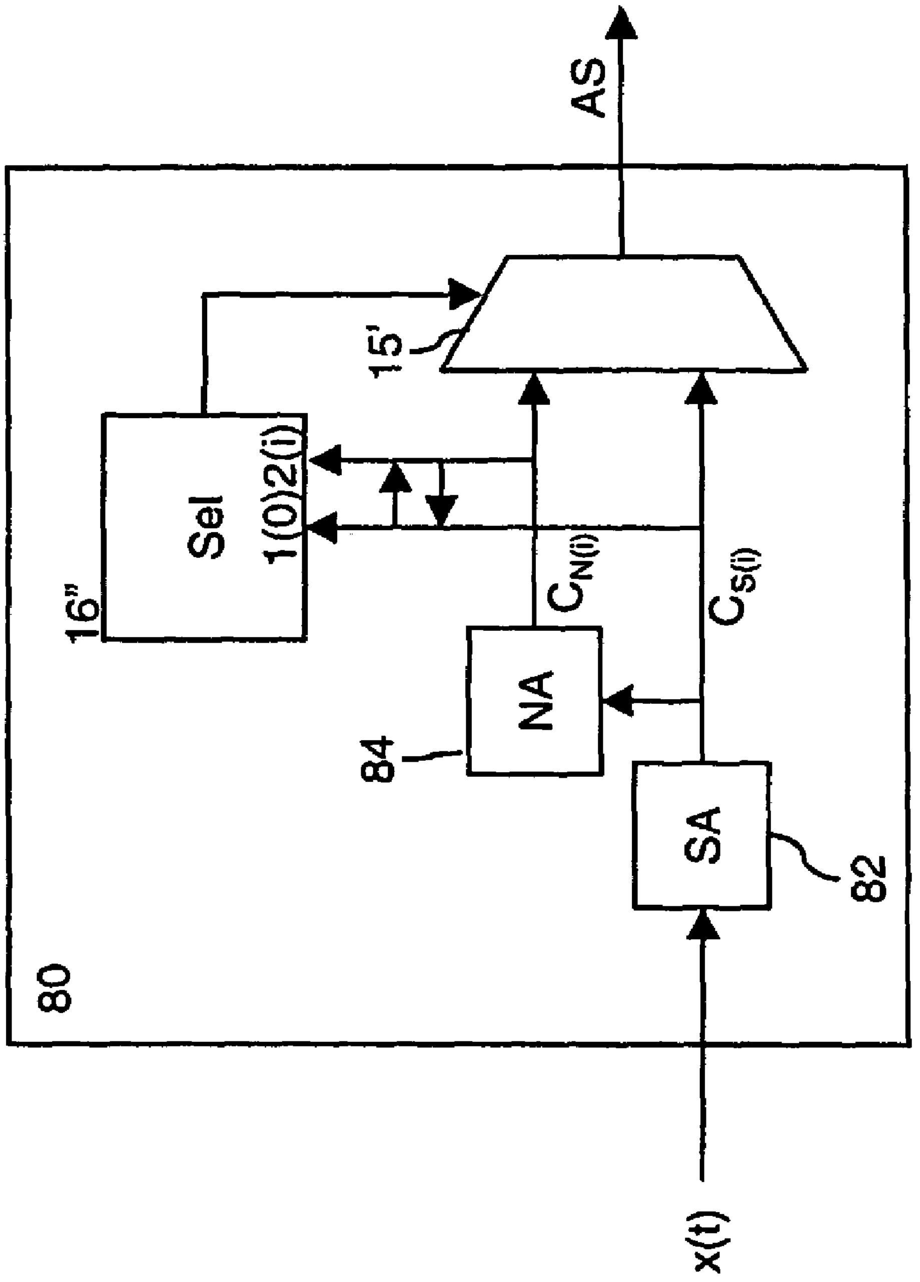
FIG. 7 shows an encoder according to a second embodiment of the present invention.

It will be seen that the invention is not alone applicable to an MPEG encoder, rather it is applicable in any encoder where a signal is encoded parametrically with noise and by some other means. Referring now to FIG. 7, in a second embodiment of the present invention the improved selection component 16" is employed within a parametric audio coder 80 to provide enhanced discrimination between noisy and non-noisy spectro-temporal intervals. An example of such a parametric coder is the sinusoidal description of audio signals, which is highly suitable for various tonal signals, described in European Patent Application No. 02077727.2 filed 8 Jul. 2002 . Within the coder, a sinusoidal analyser 82 transforms sequential segments of an input signal x(t) into the frequency domain, with each segment or frame then being modelled using a number of sinusoids represented by amplitude, frequency and possibly phase parameters $C_s$. When the synthesised sinusoidal components of a signal have been removed from the input signal, the residual signal can then be assumed to comprise noise and this is modelled in a noise analyser 84 to produce noise codes $C_N$. Each of the sinusoidal codes and noise codes $C_S$, $C_N$ are then encoded in a bitstream AS. Other components of the signal which may be coded include transients and harmonic complexes, however, these are not described here for clarity.

The invention is implemented in such an encoder as follows: The original input signal x(t) is first coded by default to provide a combination of noise and sinusoidal codes $C_{S(1)}$, $C_{N(1)}$ and these coded segments are provided as input I/P1(0) of a selection component 16" corresponding to the component 16' of FIG. 2.

Then for each of a plurality of frequency bands i in a given segment n, the sinusoidal analyser 82 does not encode sinusoidal components within the frequency band and so the (greater) residual signal is encoded by the noise analyser 84. Each of the candidate noise and sinusoidal codes $C_{S(i)}$, $C_{N(i)}$ produced are then provided to I/P2(*i*) of the selection component 16". Based on the resulting distortion D, a decision can be made about which candidate set of codes $C_{S(i)}$, $C_{N(i)}$ is most efficient in terms of bitrate and does not have a distortion that exceeds the predefined threshold.

Figure 8:
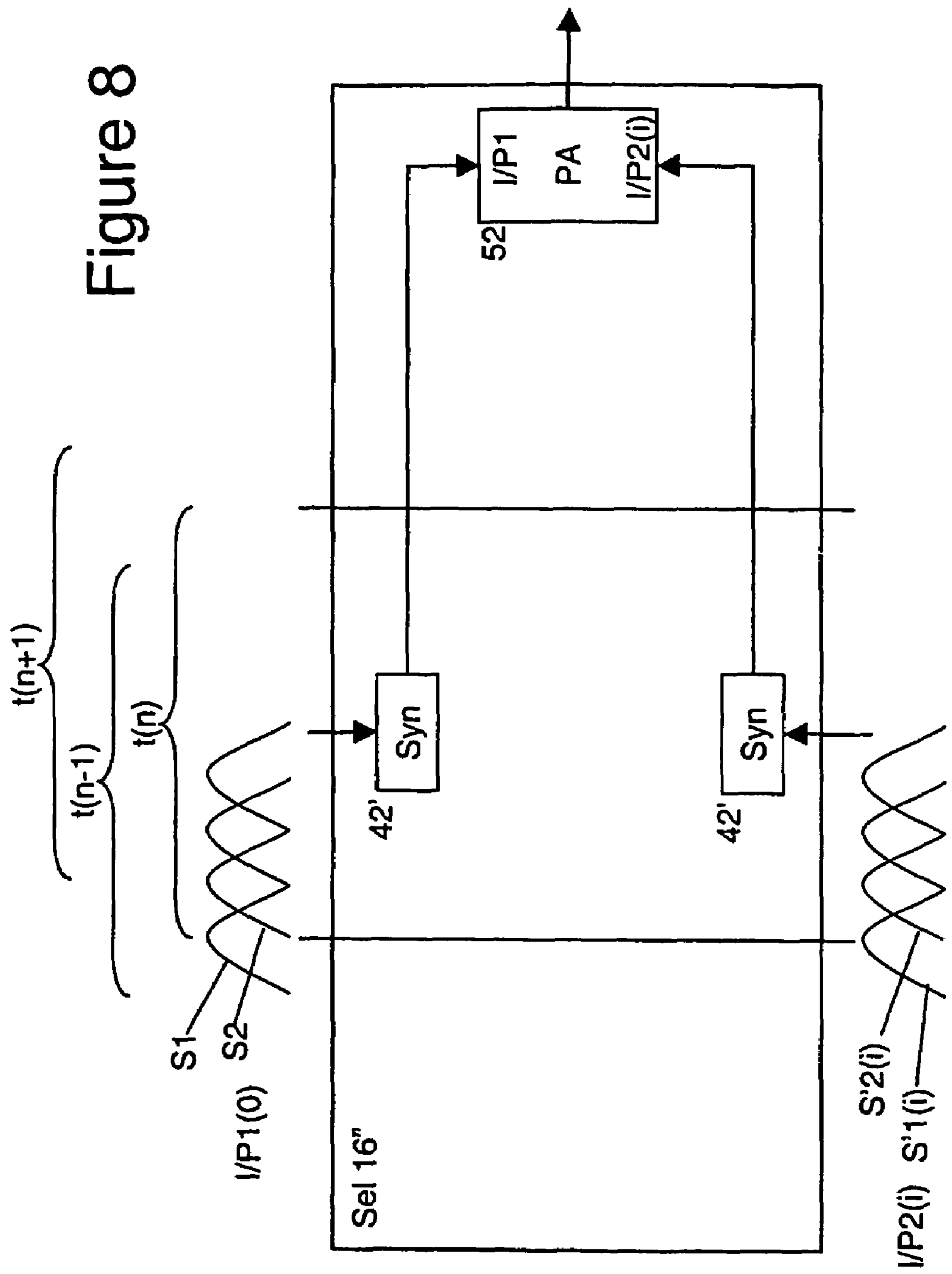
FIG. 8 shows the operation of a selection component operable within the encoder of FIG. 7.

Referring now to FIG. 8, as in the first embodiment, for each input I/P1 and I/P2(*i*), codes for a plurality of segments s1,s2 and s'1(*i*),s'2(*i*), are synthesized and combined using respective Hanning window functions in units 42' to provide time-windowed signals for an interval t(n) as inputs to the perceptual analyser 52, which operates as described in relation to the first embodiment. The analyser 52 therefore provides a decision as to whether the modelling of a given band in a given segment with a combination of sinusoids and noise (I/P1) as compared to noise alone (I/P2(*i*)) will be audible or not. It can then be left to the multiplexer 15' to determine which sets of codes 1 . . . i to employ across segments . . . s1,s2 . . . to provide an optimum bit rate for encoding the signal x(t).

As in the first embodiment, rather than iteratively testing each interval against a noise substituted version of the input signal, a candidate spectro-temporal interval of the input signal can simply be compared against a pre-calculated representation for a noise signal for the same interval to determine whether the candidate interval is noisy or not.

In either case, this means that for a parametric coder, noise-classified intervals need not be represented by sinusoids or other components such as harmonic complexes or transients with possible savings in bit rate and possible quality improvement because a noisy interval would not be represented by sinusoids in particular.

It will be seen that using the second embodiment in particular, the specified spectro-temporal intervals of an audio signal replaced by noise will have an energy equal to that of the conventionally modelled audio signal.

As described above in relation to both embodiments, in order to let the noise substitution work well, it was found that it is important to first substitute noise over a longer temporal interval to determine whether substitution is allowed. After that, the actual final substitution is only done for a much smaller interval. Although the invention may be implemented as such, it has been found that, in general, if noise is only classified in the test interval that will later be used for the final substitution, rather unreliable classifications will result.

However, if employing long temporal test intervals proves problematic, instead of taking such a long interval for classification, a broad spectral interval (with a short duration) could also be used, with the final substitution only being made in a narrower spectral interval.

The invention claimed is:

1. A method of classifying a spectro-temporal interval of an input audio signal (x(t)) comprising:

first modeling said spectro-temporal interval of said input audio signal according to a perceptual model to provide a first representation;

second modeling said spectro-temporal interval using a modified noise substituted input signal according to said perceptual model to provide a second representation; and classifying said spectro-temporal interval of said audio signal as being noise or not based on a comparison of said first and second representations, wherein said perceptual model comprises:

a first plurality of x filters, each providing respective band-pass filtered time-domain signals derived from said input audio signal for each of a first plurality of frequency bands;

a rectifier and a low-pass filter for processing each of said band-pass filtered signals;

a transformer for providing a frequency spectrum representation of said processed and filtered signals; and a second plurality of y filters, each providing respective band-pass filtered frequency-domain signals derived from each of said transformed signals for each of a second plurality of frequency bands, wherein each of said first and second representations comprises an x*y matrix of filtered frequency-domain information.

2. The method as claimed in claim 1, wherein each of said first and second representations comprises an x*y matrix including an integral of said filtered frequency-domain information.

3. The method as claimed in claim 1, wherein said modified noise substituted input signal comprises a temporal interval of said input audio signal in which a frequency band is replaced with a noise-modeled signal.

4. The method as claimed in claim 3, wherein said method further comprises the steps of:

iteratively replacing frequency bands of said temporal interval of said input audio signal with a noise-modeled signal to provide a series of modified input signals each corresponding to a candidate spectro-temporal interval to be classified;

iteratively said series of modified input signals to provide a series of second representations; and iteratively classifying said candidate spectro-temporal intervals based on a comparison of said first and each of said series of second representations.

5. The method as claimed in claim 1, wherein said spectro-temporal interval of said input audio signal comprises a selected frequency band for a temporal interval of said input audio signal, and wherein said modified noise substituted input signal comprises a noise-modeled signal for said frequency band.

6. The method as claimed in claim 5, wherein said second step is performed only once.

7. The method as claimed in claim 5, wherein said method further comprises the step of:

determining the extent to which substitution of a noise in an input signal for said selected frequency band will be masked by the remainder of the input audio signal, and wherein said classifying step comprises classifying said spectro-temporal interval of said audio signal as a function of said comparison of said first and second representations and the extent of said masking.

8. A method of coding an audio signal comprising the steps of:

classifying a spectro-temporal signal of said audio signal as noise or not according to the steps as claimed in claim 1;

modeling at least portion of a spectro-temporal interval classified as noise with noise model parameters; and encoding said noise model parameters in a bit stream.

9. The method as claimed in claim 8, wherein said portion of a spectro-temporal interval comprises a temporal sub-set of said spectro-temporal interval.

10. The method as claimed in claim 8, wherein said portion of a spectro-temporal interval comprises a spectral sub-set of said spectro-temporal interval.

11. A The method as claimed in claim 8, wherein said spectro-temporal interval comprises a time period of greater length than a basic interval length in said bit stream.

12. An apparatus for classifying a spectro-temporal interval of an input audio signal said device comprising:

means for modeling said spectro-temporal interval of said input audio signal according to a perceptual model to provide a first representation;

means for modeling said spectro-temporal interval using a modified noise substituted input signal according to said perceptual model to provide a second representation; and means classifying said spectro-temporal interval of said audio signal as being noise or not based on a comparison of said first and second representations, wherein said perceptual model comprises:

a first plurality of x filters, each providing respective band-pass filtered time-domain signal derived from said input audio signal for each of a first plurality of frequency bands;

a reciter and a low-pass filter for processing each of said band-pass filtered signals;

a transformer for providing a frequency spectrum representation of said processed and filtered signals; and a second plurality of y filters, each providing respective band-pass filtered frequency-domain signals derived from each of said transformed signals for each of a second plurality of frequency bands, wherein each of said first and second representations comprises an x*y matrix of filtered frequency-domain information.

13. A coder including a apparatus as claimed in claim 12, wherein said device is employed to determine if a spectro-temporal interval is to be coded using noise model parameters.

14. The coder as claimed in claim 13, wherein said coder is one of a sinusoidal coder or an MPEG type coder.

* * * * *